United States Patent
Wu et al.

(10) Patent No.: US 10,394,289 B1
(45) Date of Patent: Aug. 27, 2019

(54) CARD RISER

(71) Applicant: Dell Products L.P., Round Rock, TX (US)

(72) Inventors: Hung-Wen Wu, New Taipei (TW); Kuang Hsi Lin, Taouyuan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/971,421

(22) Filed: May 4, 2018

(51) Int. Cl.
*G06F 1/18* (2006.01)
*B23P 19/04* (2006.01)

(52) U.S. Cl.
CPC .............. *G06F 1/183* (2013.01); *B23P 19/04* (2013.01)

(58) Field of Classification Search
None
See application file for complete search history.

(56) References Cited

U.S. PATENT DOCUMENTS

| | | | | |
|---|---|---|---|---|
| 5,831,821 A * | 11/1998 | Scholder | ................ | G06F 1/184 361/679.32 |
| 6,252,514 B1 * | 6/2001 | Nolan | ..................... | G06F 1/183 340/686.4 |
| 6,556,451 B1 * | 4/2003 | Feightner | ............. | H05K 7/1417 361/679.32 |
| 9,629,291 B1 * | 4/2017 | Chen | ....................... | G06F 1/185 |
| 10,146,271 B1 * | 12/2018 | Pav | .......................... | G06F 1/185 |
| 2012/0281373 A1 * | 11/2012 | Bohannon | ............ | H05K 7/1489 361/756 |
| 2014/0106595 A1 * | 4/2014 | Zhu | ........................ | H01R 13/62 439/345 |
| 2015/0115120 A1 * | 4/2015 | Yu | ......................... | H05K 7/1487 248/288.11 |
| 2016/0064040 A1 * | 3/2016 | Hartman | ................. | G06F 1/185 360/97.12 |
| 2016/0066468 A1 * | 3/2016 | Smith | .................... | H05K 7/208 361/679.52 |

* cited by examiner

*Primary Examiner* — Binh B Tran
*Assistant Examiner* — Douglas R Burtner
(74) *Attorney, Agent, or Firm* — Jackson Walker L.L.P.

(57) ABSTRACT

An apparatus may include a connector configured to receive an information handling resource, and a riser configured to provide mechanical support to the information handling resource when the information handling resource is received in the connector, wherein the riser is configured to accept a first type of information handling resource having a first length along a selected direction, and a second type of information handling resource having a second length along the selected direction, the second length being greater than the first length. The riser may include a fixed portion, and a rear portion rotatably coupled to the fixed portion, the rear portion including a slidable member configured to slide from a first position to a second position along the selected direction, the first position allowing the riser to accept the first type, and the second position allowing the riser to accept the second type of information handling resource.

20 Claims, 7 Drawing Sheets

CARD RISER

TECHNICAL FIELD

The present disclosure relates in general to information handling systems, and more particularly to systems and methods for coupling information handling resources to information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction, and damage leading to a shortened component lifespan. Accordingly, heatsinks and/or air movers (e.g., cooling fans and blowers) have often been used in information handling systems to cool information handling systems and their components.

Mechanical risers may be used to provide mechanical support to certain types of information handling resources when installed in information handling systems. For example, risers are often used with information handling resources that have a card-type form factor, such as Peripheral Component Interconnect Express (PCIe) cards.

One difficulty that has arisen is the need to build separate types of risers to accommodate various different types of information handling resources. For example (continuing in the discussion of PCIe cards), both full-height and low-profile PCIe cards are in common use, having differing size dimensions. In particular, full-height PCIe cards may typically have a bracket height of 120 mm, while low-profile PCIe cards may typically have a bracket height of 79.2 mm. Building and stocking multiple types of risers to accommodate these size differences may significantly complicate the logistics for manufacturers or assemblers of information handling systems.

Other examples of information handling resources that are compatible with a single type of connector, but that have different standardized sizes in at least one dimension, will be apparent to one of ordinary skill in the art with the benefit of this disclosure.

In light of the above, it would be desirable for a single type of riser to be able to accommodate more than one size or type of information handling resource, particularly (but not necessarily) in the case where a single type of connector is usable with the different information handling resources.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with coupling information handling resources to information handling systems may be reduced or eliminated.

In accordance with embodiments of the present disclosure, an information handling system may include a processor, a memory communicatively coupled to the processor, a connector communicatively coupled to the processor and configured to receive an information handling resource, and a riser configured to provide mechanical support to the information handling resource when the information handling resource is received in the connector, wherein the riser is configured to accept a first type of information handling resource having a first length along a selected direction, and a second type of information handling resource having a second length along the selected direction, the second length being greater than the first length. The riser may include a fixed portion fixedly coupleable to the information handling system; and a rear portion rotatably coupled to the fixed portion, wherein the rear portion includes a slidable member configured to slide from a first position to a second position along the selected direction, the first position allowing the riser to accept the first type of information handling resource, and the second position allowing the riser to accept the second type of information handling resource.

In accordance with these and other embodiments of the present disclosure, a method may include forming a riser from a riser material, the riser being configured to provide mechanical support to an information handling resource; and coupling the riser to a connector of an information handling system. The riser may be configured to accept a first type of information handling resource having a first length along a selected direction, and a second type of information handling resource having a second length along the selected direction, the second length being greater than the first length. The riser may include a fixed portion; and a rear portion rotatably coupled to the fixed portion, wherein the rear portion includes a slidable member configured to slide from a first position to a second position along the selected direction, the first position allowing the riser to accept the first type of information handling resource, and the second position allowing the riser to accept the second type of information handling resource.

In these and other embodiments of the present disclosure, an apparatus may include a connector configured to receive an information handling resource, and a riser configured to provide mechanical support to the information handling resource when the information handling resource is received in the connector, wherein the riser is configured to accept a first type of information handling resource having a first length along a selected direction, and a second type of information handling resource having a second length along the selected direction, the second length being greater than the first length. The riser may include a fixed portion, and a rear portion rotatably coupled to the fixed portion, the rear portion including a slidable member configured to slide from a first position to a second position along the selected direction, the first position allowing the riser to accept the first type, and the second position allowing the riser to accept the second type of information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 3B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected indirectly or directly, with or without intervening elements.

When two or more elements are referred to as "coupleable" to one another, such term indicates that they are capable of being coupled together.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "connector" may include any physical component of an information handling system (typically but not necessarily located on a motherboard or other circuit board of such system) that is configured to receive an information handling resource. The term "receiving" an information handling resource is to be understood to include receiving a cable or the like which is configured to couple the connector to the information handling resource, even if the information handling resource itself is not directly received in the connector. Examples of connectors include expansion slots such as Peripheral Component Interconnect (PCI) slots and Peripheral Component Interconnect Express (PCIe) slots or risers. Other examples include connectors configured to couple to physical storage resources (e.g., hard disk drives, solid state drives, etc.), such as SATA connectors, mSATA connectors, M.2 connectors, U.2 connectors, etc. Yet other examples include USB connectors, fan headers, PSU connectors, etc.

Figure 1:
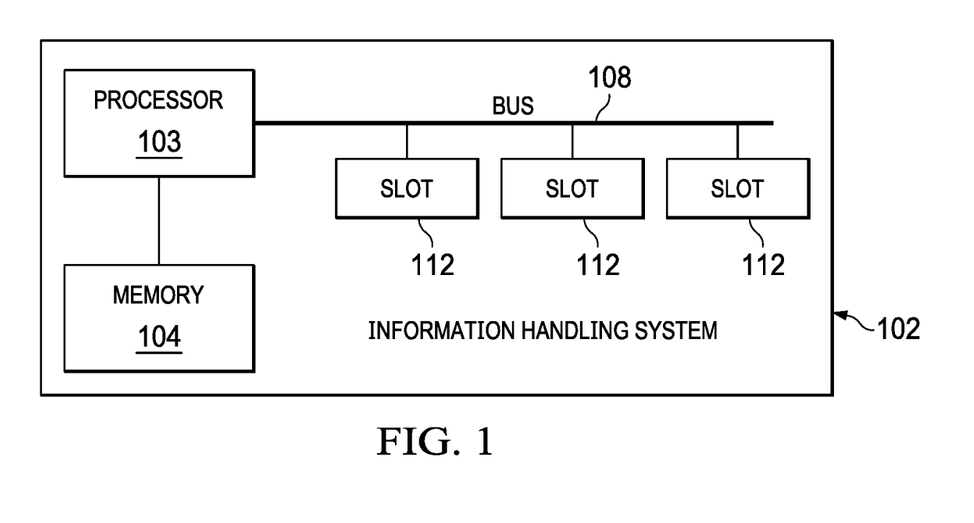
FIG. 1 illustrates a block diagram of an example information handling system, in accordance with embodiments of the present disclosure.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources" herein). As shown in FIG. 1, information handling system 102 may comprise a processor 103, a memory 104, a bus 108, and a plurality of slots 112. Each slot 112 may include a connector for communicatively coupling an information handling resource to processor 103, as well as a riser for mechanically supporting the information handling resource.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Memory 104 may have stored thereon an operating system. Such an operating system may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by the operating system. In addition, the operating system may include all or a portion of a network stack for network communication via a network interface (e.g., an information handling resource of information handling system 102 may be a network interface for communication over a data network). Although the operating system may be stored in memory 104, in some embodiments it may be stored in storage media accessible to processor 103, and active portions of the operating system may be transferred from such storage media to memory 104 for execution by processor 103.

Slots 112 may be communicatively coupled to processor 103 via bus 108 and may generally include any type of connector for coupling to an information handling resource. In some embodiments, information handling system 102 may also include a management controller, which may be configured to provide out-of-band management facilities for management of information handling system 102. Such management may be made by a management controller even if information handling system 102 is powered off or powered to a standby state. A management controller may include a processor, memory, an out-of-band network interface separate from and physically isolated from an in-band network interface of information handling system 102, and/or other embedded information handling resources. In certain embodiments, a management controller may include or may be an integral part of a baseboard management controller (BMC) or a remote access controller (e.g., a Dell Remote Access Controller or Integrated Dell Remote Access Controller). In other embodiments, a management controller may include or may be an integral part of a chassis management controller (CMC).

In addition to processor 103, memory 104, bus 108, and slots 112, information handling system 102 may include one or more other information handling resources.

Figure 2A:
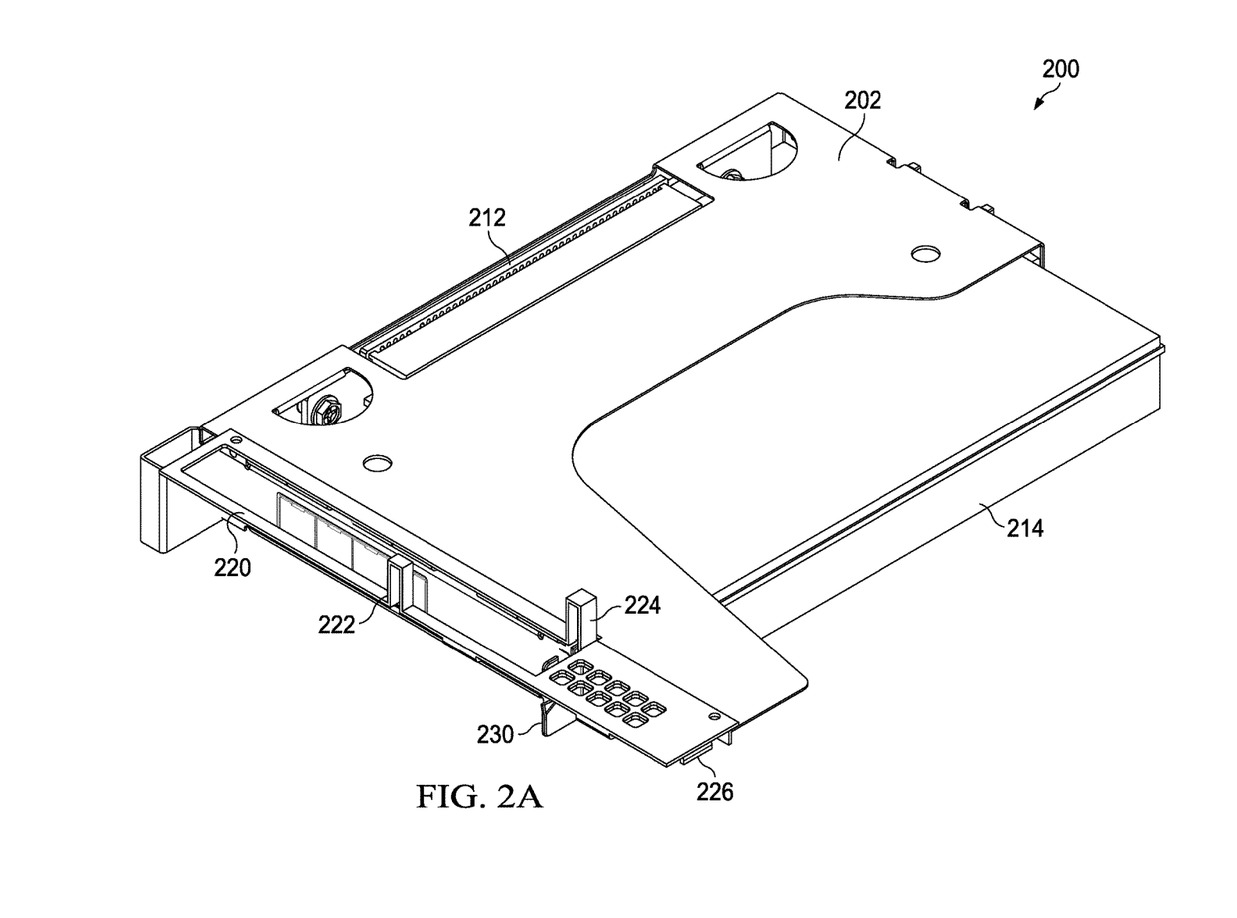
FIGS. 2A and 2B illustrate a riser configured to accept an information handling resource of a first type, in accordance with embodiments of the present disclosure.

FIG. 2A illustrates a perspective view of riser 200 for mechanically supporting an information handling resource that is received by connector 212. In the illustrated embodiment, connector 212 is a PCIe slot, and information handling resource 214 is a full-height PCIe card. Riser 200 may be constructed from any suitable structural material, as will be understood by one of ordinary skill in the art. In some embodiments, riser 200 may be formed (e.g., stamped or extruded) from metal such as steel or aluminum. In other embodiments, riser 200 may be formed from plastic or the like.

As shown in FIG. 2A, riser 200 may include a fixed portion 202, which may be rigidly mounted within information handling system 102. Riser 200 may also include rear portion 220, which is rotatable relative to fixed portion 202. Rear portion 220 may further include slide 226, which, as described in further detail below, may be used to adapt riser 200 to accept different sizes of information handling resource.

In the view shown in FIG. 2A, rear portion 220 is rotated approximately 90 degrees away from a position in which rear portion 220 would be secured to fixed portion 202, allowing for insertion and/or removal of information handling resource 214. Riser 200 may typically be disposed within information handling system 102 such that rear portion 220 may reside at a rear chassis wall of information handling system 102. A bracket 230 of information handling resource 214 (described in further detail below) may provide access from an exterior of such a chassis to connectors of information handling resource 214.

Rear portion 220 may further include protruding structures 222 and 224 for coupling to a bracket of an information handling resource received by connector 212. In particular, protruding structure 224 may be used to couple to the bracket of information handling resource 214, as information handling resource 214 is a full-height information handling resource. As described in further detail below, protruding structure 222 may be used to couple to a bracket of a low-profile information handling resource, when such a low-profile information handling resource is received by connector 212.

Figure 2B:
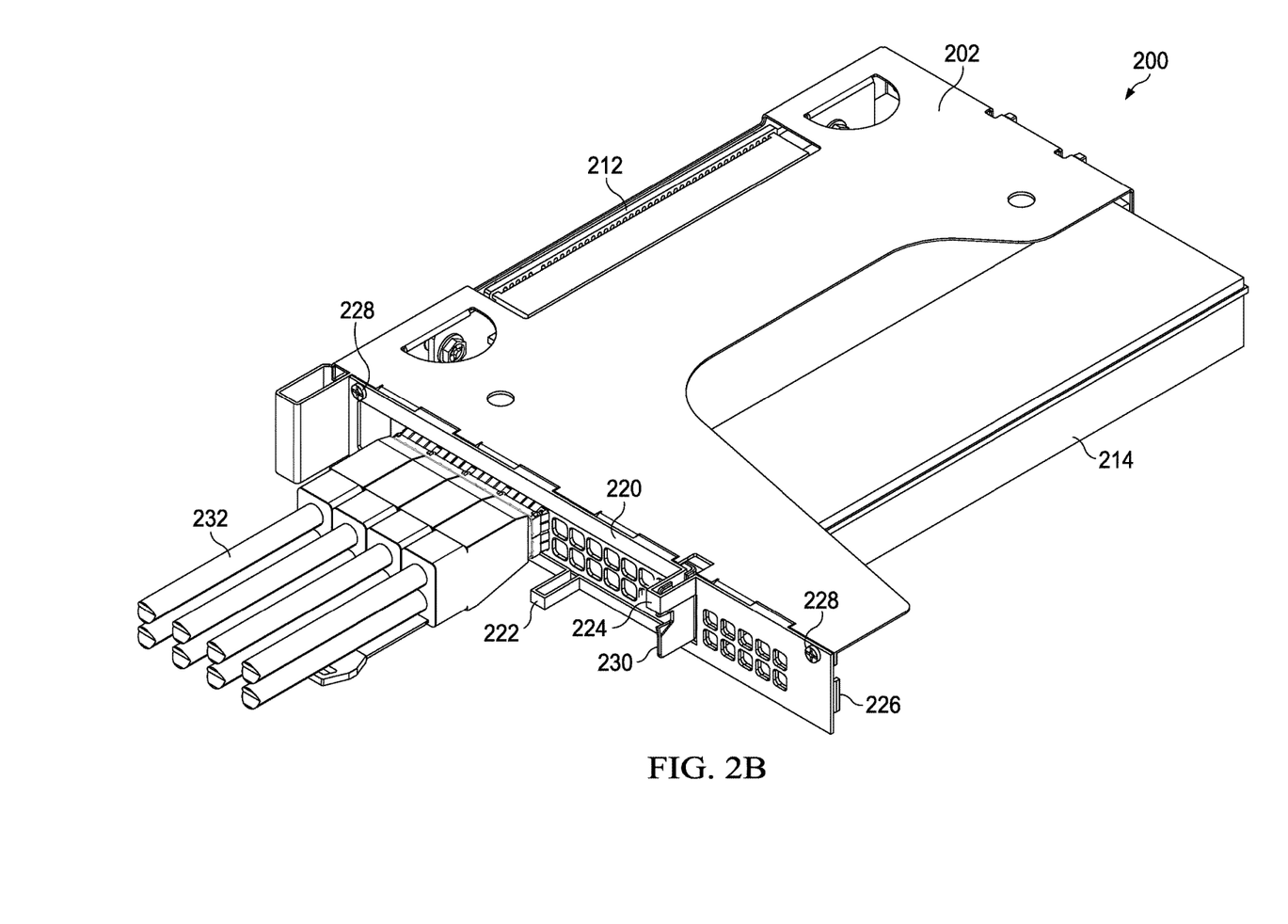

FIG. 2B illustrates riser 200 with rear portion 220 rotated downward into a position in which it may be secured to fixed portion 202. In some embodiments, rear portion 220 may be secured to fixed portion 202 via one or more fasteners such as screw 228. With rear portion 220 in the position shown, information handling resource 214 is fully secured, with bracket 230 being coupled to and retained by protruding structure 224.

With information handling resource 214 so secured, cable 232 may be coupled to information handling resource 214, and information handling resource 214 may be operated by information handling system 102.

Figure 2C:
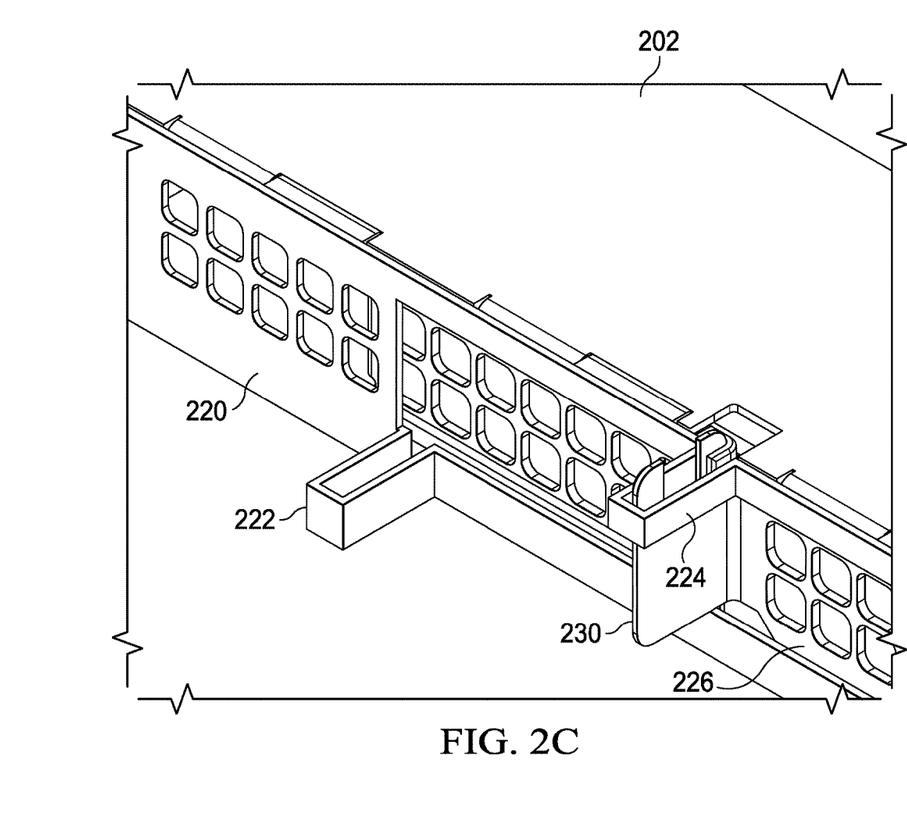
FIGS. 2C and 2D illustrate detail views of the riser of FIGS. 2A and 2B, in accordance with embodiments of the present disclosure.

Turning now to FIG. 2C, a detail view of rear portion 220 is shown, illustrating protruding structures 222 and 224. As noted above, when rear portion 220 is rotated downward into this orientation, protruding structure 224 may couple to bracket 230 of information handling resource 214, which may provide mechanical retention of information handling resource 214 in riser 200.

Figure 2D:
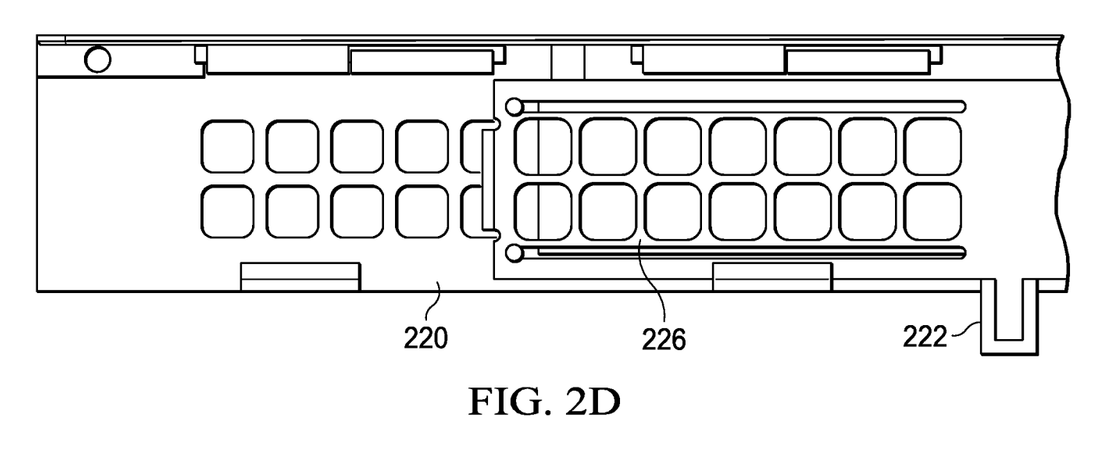

In situations in which it is desirable to use riser 200 for a low-profile information handling resource, slide 226 may be moved relative to the remainder of rear portion 220 to accommodate the difference in size between the bracket of full-height information handling resource 214 and the corresponding bracket of a low-profile information handling resource. In particular, FIG. 2D shows a detail view of the back side of rear portion 220. In the arrangement of FIG. 2D, information handling resource 214 has been removed, and slide 226 has been translated into a position that will allow a low-profile information handling resource to be received in connector 212. In particular, from the viewpoint of FIG. 2D, slide 226 has been moved rightward. (From the viewpoint of FIG. 2C, this translation of slide 226 would be a leftward movement.)

The translation of slide 226 may allow connector 212 and riser 200 to accept a low-profile information handling resource (including a correspondingly smaller bracket) without leaving a gap at the back of information handling system 102. Such a gap could lead to electromagnetic interference issues, as well as thermal airflow bypass issues. Thus the ability to close such a gap via slide 226 may provide significant advantages.

Figure 3A:
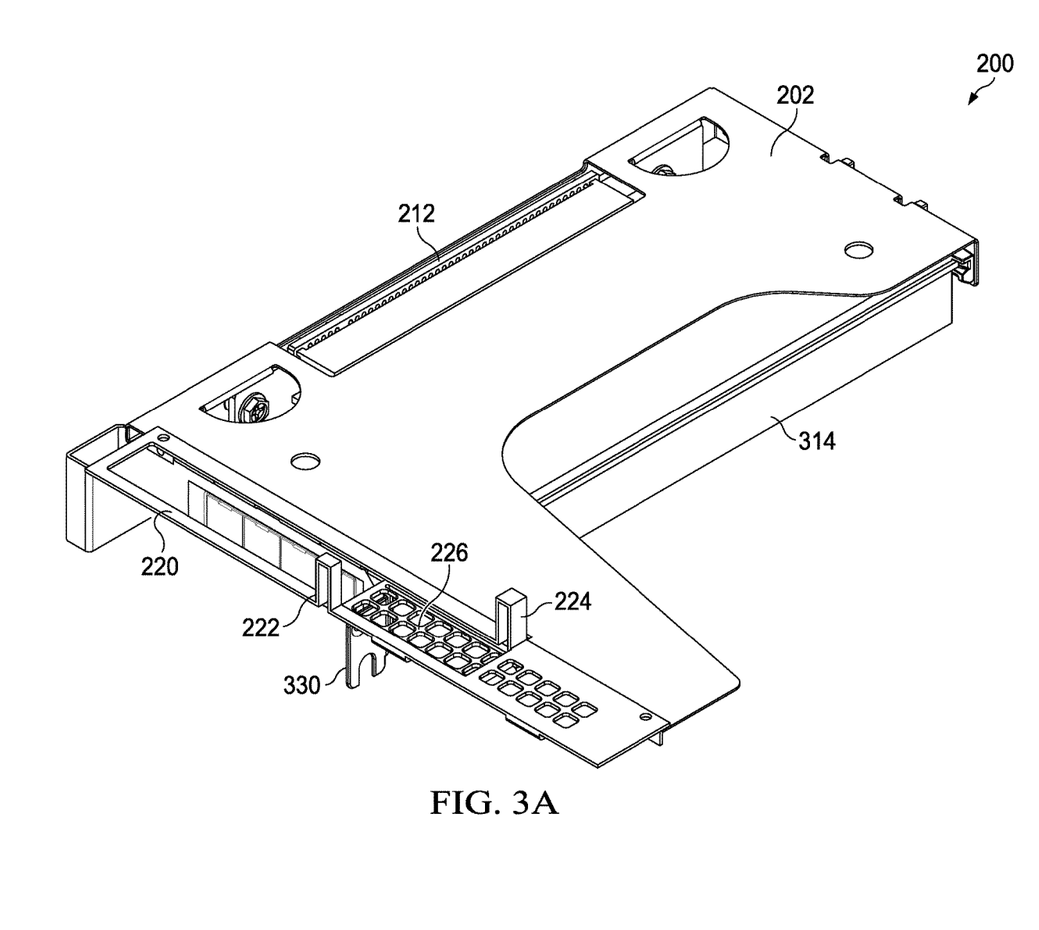
FIGS. 3A and 3B illustrate the riser of FIGS. 2A-2D reconfigured to accept an information handling resource of a second type, in accordance with embodiments of the present disclosure.

FIG. 3A shows the insertion of a low-profile information handling resource 314 into connector 212. In the view shown in FIG. 3A, rear portion 220 is rotated approximately 90 degrees away from a position in which rear portion 220 would be secured to fixed portion 202, allowing for insertion and/or removal of information handling resource 314. A bracket 330 of information handling resource 314 may provide access from an exterior of chassis to connectors of information handling resource 314. As shown in FIG. 3A, slide 226 has been translated to the left to cover a gap that would otherwise have been left by the size difference between bracket 330 and bracket 230.

Figure 3B:
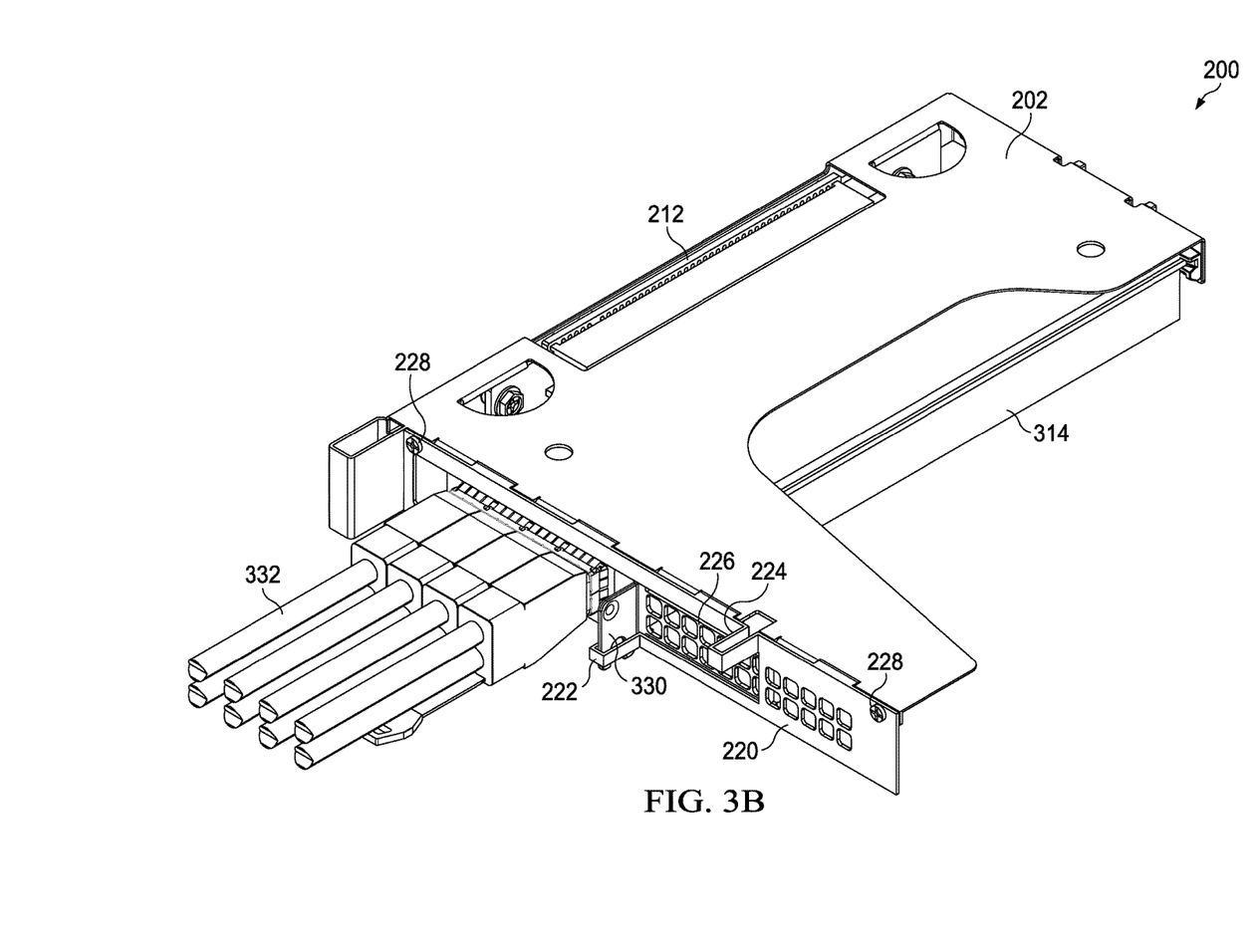

FIG. 3B illustrates riser 200 with rear portion 220 rotated downward into the position in which it may be secured to fixed portion 202 (e.g., via one or more fasteners such as screw 228). With rear portion 220 in the position shown, information handling resource 314 is fully secured, with bracket 330 being coupled to and retained by protruding structure 222.

With information handling resource 314 so secured, cable 332 may be coupled to information handling resource 314, and information handling resource 314 may be operated by information handling system 102.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor;
   a memory communicatively coupled to the processor;
   a connector communicatively coupled to the processor and configured to receive an information handling resource; and
   a riser configured to provide mechanical support to the information handling resource when the information handling resource is received in the connector, wherein the riser is configured to accept a first type of information handling resource having a first length along a selected direction, and a second type of information handling resource having a second length along the selected direction, the second length being greater than the first length, the riser including:
      a fixed portion fixedly coupleable to the information handling system; and
      a rear portion rotatably coupled to the fixed portion, wherein the rear portion includes a slidable member configured to slide from a first position to a second position along the selected direction, the first position allowing the riser to accept the first type of information handling resource, and the second position allowing the riser to accept the second type of information handling resource.

2. The information handling system of claim 1, wherein the connector is a Peripheral Component Interconnect Express (PCIe) connector.

3. The information handling system of claim 1, wherein the rear portion of the riser is proximate to a rear wall of a chassis of the information handling system.

4. The information handling system of claim 3, wherein the information handling resource is accessible from an exterior of the chassis.

5. The information handling system of claim 1, wherein the rear portion of the riser includes a first protruding structure configured to couple to a bracket of the first type of information handling resource.

6. The information handling system of claim 5, wherein the rear portion of the riser further includes a second protruding structure configured to couple to a bracket of the second type of information handling resource.

7. The information handling system of claim 1, wherein the rear portion of the riser is rotatable through an angle of approximately 90 degrees relative to the fixed portion of the riser.

8. The information handling system of claim 7, wherein the rear portion of the riser is securable to the fixed portion of the riser via a fastener.

9. A method comprising:
   forming a riser from a riser material, the riser being configured to provide mechanical support to an information handling resource; and
   coupling the riser to a connector of an information handling system, wherein the riser is configured to accept a first type of information handling resource having a first length along a selected direction, and a second type of information handling resource having a second length along the selected direction, the second length being greater than the first length, the riser including:
      a fixed portion; and
      a rear portion rotatably coupled to the fixed portion, wherein the rear portion includes a slidable member configured to slide from a first position to a second position along the selected direction, the first position allowing the riser to accept the first type of information handling resource, and the second position allowing the riser to accept the second type of information handling resource.

10. The method of claim 9, wherein the riser material is steel.

11. The method of claim 9, wherein the connector is a Peripheral Component Interconnect Express (PCIe) connector.

12. The method of claim 9, further comprising forming a protruding structure in the rear portion of the riser, the protruding structure being operable to couple to a bracket of the information handling resource.

13. An apparatus comprising:
a connector configured to receive an information handling resource; and
a riser configured to provide mechanical support to the information handling resource when the information handling resource is received in the connector, wherein the riser is configured to accept a first type of information handling resource having a first length along a selected direction, and a second type of information handling resource having a second length along the selected direction, the second length being greater than the first length, the riser including:
a fixed portion; and
a rear portion rotatably coupled to the fixed portion, wherein the rear portion includes a slidable member configured to slide from a first position to a second position along the selected direction, the first position allowing the riser to accept the first type of information handling resource, and the second position allowing the riser to accept the second type of information handling resource.

14. The apparatus of claim 13, wherein the connector is a Peripheral Component Interconnect Express (PCIe) connector.

15. The apparatus of claim 13, wherein the rear portion of the riser is proximate to a rear wall of a chassis of an information handling system communicatively coupleable to the information handling resource.

16. The apparatus of claim 13, wherein the rear portion of the riser includes a first protruding structure configured to couple to a bracket of the first type of information handling resource.

17. The apparatus of claim 16, wherein the rear portion of the riser further includes a second protruding structure configured to couple to a bracket of the second type of information handling resource.

18. The apparatus of claim 13, wherein the rear portion of the riser is rotatable through an angle of approximately 90 degrees relative to the fixed portion of the riser.

19. The apparatus of claim 13, wherein the rear portion of the riser is securable to the fixed portion of the riser via a fastener.

20. The apparatus of claim 19, wherein the fastener is a screw.

* * * * *